April 16, 1935.  A. B. PAGE  1,998,332
HEATING APPARATUS AND SYSTEM
Filed Feb. 1, 1933
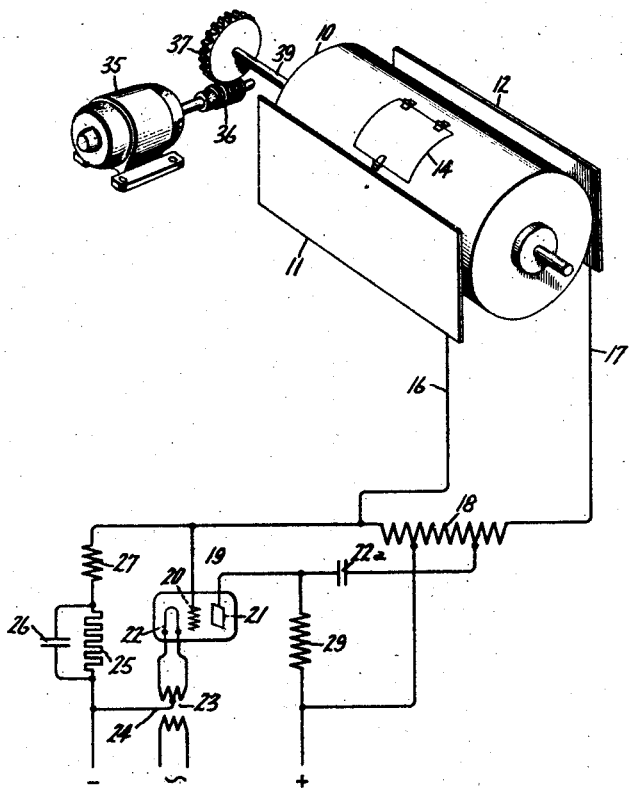
Inventor:
Albert B. Page,
by Chas. W. Miller
His Attorney.

Patented Apr. 16, 1935

1,998,332

UNITED STATES PATENT OFFICE 1,998,332

HEATING APPARATUS AND SYSTEM

Albert B. Page, Schenectady, N. Y., assignor to General Electric Company, a corporation of New York Application February 1, 1933, Serial No. 654,633

5 Claims. (Cl. 219—47)

My invention relates to electric heating apparatus of the type in which the heat is generated in the heated body itself, more particularly to electric heaters which are suitable for the heating of materials of heterogeneous size, such as plant bulbs, and has for its object the provision of a simple, reliable and effective electric heating apparatus utilizing currents of high frequencies.

My invention has particular application to the heat treatment of plant bulbs. It is well known that plant bulbs are attacked and often destroyed by nematodes in the bulbs. The nematodes or small worms cause great losses in plant bulbs every year. It is a further object of my invention to provide a method of treating the plant bulbs so as to kill the worms or nematodes without damaging the bulbs.

In carrying out my invention in one form thereof, I raise the temperature of the bulbs above the temperature at which the nematodes can exist by placing the bulbs in an electric field of high frequency for a predetermined time. In order to prevent damage to the bulbs themselves a very uniform heating of all bulbs must be achieved irrespective of their size. If, for example, a mixture of large bulbs and small bulbs is subjected to the high frequency heating the smaller bulbs will become overheated and will thereby be damaged. I have found, however, that by placing the bulbs in an electrically non-conducting container and rotating the container during the heating process, uniform heating may be obtained irrespective of the size of the bulbs.

For a more complete understanding of my invention reference should be had to the accompanying drawing in which I have shown diagrammatically a system embodying my invention.

Referring to the drawing, I have shown my invention in one form suitable for the heat treatment of plant bulbs placed within an electrically non-conducting container 10 rotatably mounted between the electrodes 11 and 12. The bulbs or other material such as coffee beans to be heat-treated are introduced into the container 10 through a door 14. The electrodes 11 and 12 are connected by conductors 16 and 17 to a source of high frequency supply shown as a three-element electron discharge device or tube 19. It will be understood that the electron discharge device 19 operates in a manner similar to a high frequency short wave tube oscillator, such as used in radio transmission, and produces current of similar high frequencies on the order of ten to sixty million cycles per second. In the particular source of high frequency shown, the plates 11 and 12 are connected respectively to the grid 20 and the anode or plate 21, a suitable inductance 18 and a capacitor 22a being included in the respective connections so as to form a resonant high frequency oscillation circuit. At these very high frequencies the inductance in the conductors themselves may be sufficient to produce the desired resonant condition in which case no auxiliary inductance would be provided.

The filamentary cathode 22 of the discharge device is heated from a suitable source of alternating current which is connected to the cathode through a suitable transformer 23. A tap 24 on the secondary of the transformer 23 leads through a grid leak resistance 25 and a capacitor 26 connected in parallel with each other and through a choke coil 27 to the grid 20. A suitable source of electrical supply, for example a direct current source of 3000 volts or more, is connected to the tap 24 and to the plate 21, a choke coil 29 being included in the connection with the plate. As indicated by well understood symbols, the positive side of the supply source is connected to the plate and the negative side to the tap 24.

It will be understood that the high frequency generated in the oscillation circuit including the two electrodes or plates 11 and 12 may be varied by changing the constants of the circuit, for example by varying the distance between the two plates 11 and 12, or by varying the values of the inductance 18 and capacitor 22a. The high frequency used will depend upon the material to be heated. I have found that for heating plant bulbs a frequency of approximately fifteen million cycles is desirable.

In the operation of my invention the oscillatory circuit is energized as indicated by the symbols and a motor 35 is energized from a suitable source of supply (not shown). This motor serves to rotate the container or drum 10, continuously, by means of a worm gear 36 arranged in meshing relation with a gear 37 which is connected to the drum driving shaft 39.

The time of heating may be varied as a function of bulb temperature; that is to say, if the output of the source of high frequency is increased the time of heating may be correspondingly decreased.

In one application of my invention I have found that with a high frequency generator of 1 kw. capacity a heating time of forty minutes to one hour is sufficient to kill the nematodes or worms. In this application 15 million cycles were used and the bulb temperature reached approximately 117° F.

If it were not for the rotating drum of insulating material the smaller bulbs would overheat. Overheating is eliminated, however, by the rotating method of heating.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. Apparatus for uniformly heating a plurality of similar objects of various sizes comprising an electrically non-conducting container for said objects, electrodes arranged to produce an electric field intersecting said container, a source of high frequency current connected with said electrodes and means for changing the direction which said field intersects the container.

2. Means for uniformly heating plant bulbs and the like of varying sizes to destroy nematodes or worms, comprising a pair of electrodes, a source of high frequency current connected to said electrodes, an electrically non-conducting container for said bulbs mounted for rotation between said electrodes, and means for slowly rotating said container.

3. The method of uniformly heating a plurality of similar objects of various sizes arranged heterogeneously in a container which comprises subjecting the objects to a high frequency electric field and simultaneously varying the direction which the field intersects the objects.

4. The method of uniformly heating a plurality of similar objects of various sizes arranged heterogeneously in a container which comprises rotating the container and simultaneously subjecting the objects to a high frequency electric field substantially at right angles to the axis of rotation of the container.

5. The method of uniformly heating a plurality of bulbs of various sizes which comprises filling a container with said bulbs, rotating the container and simultaneously subjecting the bulbs to a high frequency electrostatic field substantially at right angles to the axis of rotation of the container.

ALBERT B. PAGE.